United States Patent Office 3,335,107
Patented Aug. 8, 1967

3,335,107
VINYL CHLORIDE RESINS PLASTICIZED WITH MIXTURES OF AN ESTER AND A HYDROXY ALKYL SULFONAMIDE
Dale R. Dill, Webster Groves, Mo., assignor to Monsanto Company, St. Louis, Mo., a corporation of Delaware
No Drawing. Filed Dec. 26, 1963, Ser. No. 333,706
12 Claims. (Cl. 260—30.4)

This invention relates to new and useful vinyl resin compositions. In particular, this invention relates to new compositions containing a polymerized vinyl chloride and a mixture of certain plasticizers therefor.

Hard surface floor coverings are more widely used today than ever before. In particular, plastic floor coverings containing a thermoplastic resin as a binder instead of linoleum cement are finding more and more applications throughout the country. Wider use of plastic floor covering has made it possible to produce the floor covering in a great variety of colors and patterns, many of which are of pastel shade or of other light color; even white floorings, or floorings containing a great deal of white are in use.

Use of these light-colored plastic floorings has produced an unexpected problem throughout the industry. Those parts of light-colored plastic floorings subjected to heavy traffic have developed undue brownish or yellowish stains. This phenomenon, known as traffic staining, now constitutes one of the major problems in the use of light-colored plastic floorings in heavy traffic areas. The industry has devoted much research time and effort in an attempt to solve this problem, but no satisfactory solution has been found as yet. It has been learned that the traffic staining problem appears to be related to the plasticizer used with the polymerized vinyl chloride binder in the flooring, but, to date, efforts to find a suitable plasticizer which will eliminate or minimize traffic staining have been unavailing.

It is a primary object of the present invention to supply a plasticized polymerized vinyl chloride resin composition, suitable for use in a plastic floor binder, which will reduce or eliminate the traffic staining phenomena. A further object is to present a plastic floor covering binder having increase strength when used in a floor covering, while at the same time minimizing traffic staining. Other objects and advantages of the invention will be apparent to those skilled in the art from the following detailed description and claims.

In accordance with this invention is has been found that the above and still further objects are achieved by incorporating a hydroxy alkyl sulfonamide, hereinafter described, in the plasticizer for the polyvinyl chloride or polyvinyl acetate-chloride binder of a floor title composition. As a plasticizer for the polymerized vinyl chloride resin, the invention contemplates from about 5 to about 100 parts by weight of a mixture of a hydroxy alkyl sulfonamide and a conventional prior art vinyl resin plasticizer per 100 parts by weight of resin. However, it is preferred to employ from about 20 to about 50 parts by weight of plasticizer per 100 parts by weight of resin.

The plasticizer mixture of this invention is employed in amounts of from 1 to 10 parts of vinyl resin plasticizer per part of hydroxy alkyl sulfonamide. Within this broader range, it is particularly preferred to employ about 1 to 4 parts by weight of the former per part by weight of the latter.

The polymerized vinyl chloride resins to be used in the compositions of the present invention may be those low to medium molecular weight resins available in commerce. Illustrative of such resins are the vinyl chloride-vinyl acetate copolymers containing about 3% to 5% vinyl acetate, made by the Bakelite Company and bearing the designation "VYMF" and "VYVF." The copolymers containing about 13% vinyl acetate, such as those designated "VYNW" and "VYHH," are also suitable. Straight polyvinyl chloride resins such as those designated as Geon and Opalon resins, particularly "Geon 121," "Geon 126" and "Opalon 630" are suitable. Mixtures of one of the homopolymers and a copolymer will frequently be used. The most significant property of the polymerized vinyl chloride resins suitable for use in the compositions of the present invention is that of yielding a hard, tough and otherwise desirable surface covering material after being plasticized and admixed with suitable fillers and other ingredients.

Generally speaking, it is contemplated that the composition to be used as a binder will comprise about 50% to about 25% by weight of the wearing surface composition of the floor covering. The binder is admixed with filler, including pigment, in such proportions that the filler comprises about 50% to about 75% by weight of the composition. When the filler content is below about 50%, pattern control may be difficult. When more than about 75% by weight of filler is present, the physical properties of the finished surface covering materials do not measure up to the desired standards in the floor covering art. The filler material may be organic or inorganic, or mixtures thereof. The filler often contains a preponderant proportion by volume of fibrous filler, such as wood flour, cork particles, asbestos, other mineral fibers and the like. The remainder of the filler component is comprised of finely divided particles such as whiting, clay, silica, slate flour and similar non-fibrous filler material. If the flooring is destined to be installed below-grade, then it is preferred that the filler system consist of inorganic fillers, either fibrous, non-fibrous or both. Such a filler system is insensitive to the alkaline moisture conditions encountered on below-grade or no-grade installations. Also included in the filler component are small but effective amounts of lubricants and detackifying agents, such as stearic acid, paraffin wax, ceresin wax, oleic acid and lauric acid. Synthetic rubber, such as the butadiene styrene copolymers or the butadiene acrylonitrile copolymers, may be added. The addition of these rubbers renders the composition sulfur-curable, whereby vulcanizing agents and the curing accelerators may then be added to the filled composition. Thus, there may be added sulfur, or sulfur containing compounds, along with various vulcanization accelerators, as for example, zinc phenyl ethyl dithiocarbamate, diethyl dithiocarbamate, zinc isopropyl dithiocarbamate, zinc diethyl dithiocarbamate, diphenyl guanadine, tetraethyl thiuram disulfide and tetramethyl thiuram disulfide. Stabilizers or anti-oxidants such as hydroquinone, N-phenyl alpha naphthylamine, N-phenyl beta naphthylamine, N,N'-exomethylene - bis - (ortho-hydroxy benzamide), sodium acid phosphate, dibutyl tin dilaurate and others known in the art, may be used. The total amount of the compounding agents, exclusive of the fibrous and non-fibrous filler, generally run up to about 10% by weight of the filler.

The conventional prior art vinyl resin plasticizing agents usually incorporated into the composition include compounds such as phthalic acid derivatives, for example, dibutyl phthalate, dihexyl phthalate, dioctyl phthalate, diisooctyl phthalate, di-2-ethylhexyl phthalate, dinonyl phthalate, diisodecyl phthalate, dicapryl phthalate, butyl octyl phthalate, butyl cyclohexyl phthalate, butyl benzyl phthalate, etc.; phosphoric acid derivatives, for example, tricresyl phosphate, triphenyl phosphate, 2-ethylhexyl diphenyl phosphate, etc.; sebacic acid derivatives such as dibutyl sebacate and di-2-ethylhexyl sebacate; glycolates such as methyl phthalyl methyl glycolate, ethyl phthalyl ethyl glycolate, butyl phthalyl butyl glycolate, dibenzyl diglycolate, etc.; glycol derivatives of benzoic acid such as diethylene glycol dibenzoate and dipropylene glycol dibenzoate; epoxidized soybean oil fatty acids; chlorinated paraffin; various polymerics such as adipic based polymerics etc.; and partially-hydrogenated terphenyls, etc.

The hydroxy alkyl sulfonamide plasticizers of this invention have the general formula:

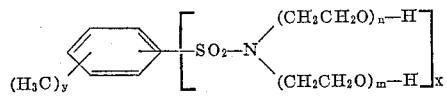

wherein:

$m$ is an integer from zero to 4.
$n$ is an integer from 1 to 4.
$x$ is an integer from 1 to 2.
$y$ is an integer from zero to 2.

As illustrative of the plasticizers within the scope of said formula are N,N-di($\beta$-hydroxyethyl)-o,p-toluenesulfonamide, N,N,N',N'-tetra($\beta$-hydroxyethyl)benzene-1,3-disulfonamide, N-($\beta$-hydroxyethyl)-o,p-toluenesulfonamide, N-polyglycol-o,p-toluenesulfonamide, and N,N'-(11 - hydroxy - 3,6,9-oxa-undecyl)benzene-1,3-disulfonamide.

In general, the hydroxy alkyl sulfonamides of this invention can be prepared by reacting toluenesulfonyl chloride with the desired alcohol amine.

The following examples will serve to further illustrate the preparation of the plasticizers of this invention and the use of such plasticizers in vinyl resins.

EXAMPLE I

A suitable reaction vessel is charged with 662.4 grams (6.3 moles) of diethanolamine and 300 milliliters of water. There is then added slowly, with agitation, 571.8 grams (3.0 moles) o,p-toluenesulfonyl chloride over a period of about 30 minutes. The resulting reaction mixture is stirred and maintained at a temperature of about 100° C. for about one hour. The reaction mixture is then washed with water and dehydrated. There is obtained 217.7 grams of N,N-di($\beta$-hydroxyethyl)-o,p-toluenesulfonamide.

EXAMPLE II

A suitable reaction vessel is charged with 488.0 grams (8.0 moles) ethanolamine and 400 milliliters of water. There is then added slowly, with agitation, 762.0 grams (4.0 moles) of o,p-toluenesulfonyl chloride over a period of about ninety minutes. The resulting reaction mixture is stirred and maintained at a temperature of about 100° C. for another 90 minutes. The reaction mixture is then washed with water and dehydrated at 50 mm. There is obtained 688.2 grams (80.2% yield) of N-($\beta$-hydroxyethyl)-o,p-toluenesulfonamide.

EXAMPLE III

A suitable reaction vessel is charged with 96.3 grams (0.35 mole) m-benzenedisulfonyl chloride. There is added, with agitation, 147.2 grams diethanolamine over a period of about one hour. The resulting reaction mixture is then maintained at a temperature of about 75° C. for about two hours. The reaction mixture is then washed with water and cooled to about 10° C. to 15° C. The precipitated product is washed with water and dehydrated. There is obtained 101.5 grams of N,N,N',N'-o,p-tetrahydroxyethyl benzene-1,3-disulfonamide.

EXAMPLE IV

A suitable reaction vessel is charged with 163.0 grams (1.0 mole) of polyglycolamine (a mixture of polyglycolamines having an axerage molecular weight of 163). There is then added, with agitation, 95.3 grams (0.5 mole) of o,p-toluenesulfonyl chloride over a period of about 30 minutes. The resulting reaction mixture is maintained at a temperature of about 90° C. for one hour. The reaction mixture is then washed with water, dehydrated and filtered. There is obtained 73.5 grams of N-polyglycol-o,p-toluenesulfonamide.

In order to demonstrate some of the desirable and unexpected properties displayed by the plasticizer mixtures of this invention, a number of resinous compositions were prepared and subjected to various test procedures. Such compositions included not only those containing said mixtures, but also others containing only one of the components of the plasticizer mixtures.

In a first series of tests, a polyvinyl chloride resin was mixed with several of the following plasticizers:

(A) Butyl benzyl phthalate.
(B) Dibenzyl diglycolate.
(C) Di-2-ethylhexyl phthalate.
(D) One part of N-($\beta$-hydroxyethyl)-o,p-toluenesulfonamide, per three parts of dibenzyl diglycolate.
(E) One part of N,N-di($\beta$-hydroxyethyl)-o,p-toluenesulfonamide, per three parts of dibenzyl diglycolate.
(F) Three parts of N,N-di($\beta$-hydroxyethyl)-o,p-toluenesulfonamide per seven parts of butyl benzyl phthalate.
(G) One part of N-($\beta$-hydroxyethyl)-o,p-toluenesulfonamide, per one part of dibenzyl diglycolate.
(H) One part of N-($\beta$-hydroxyethyl)-o,p-toluenesulfonamide per one part of butyl benzyl phthalate.
(I) One part of N-($\beta$-hydroxyethyl)-o,p-toluenesulfonamide, per three parts of butyl benzyl phthalate.
(J) One part of N,N-di($\beta$-hydroxyethyl)-o,p-toluenesulfonamide, per three parts of butyl benzyl phthalate.
(K) One part of N-($\beta$-hydroxyethyl)-o,p-toluenesulfonamide, per 2 parts of butyl benzyl phthalate.

Samples containing a 40% concentration of plasticizer were then checked for volatility and hexane extraction in accordance with A.S.T.M. procedures. In the volatility test, the sample containing plasticizer A showed a 10.2% loss, while the samples containing plasticizers D, E, F and I showed losses of only 7.5%, 4.5% 7.6% and 8.6%, respectively. In the hexane extraction test, results are summarized in the table which follows:

TABLE I

| Composition Containing Plasticizer | Hexane Extraction Test | |
|---|---|---|
| | Percent Plasticizer Extracted, 1 Hour | Percent Plasticizer Extracted, 24 Hours |
| A | 22.0 | 46.2 |
| B | 4.3 | 23.4 |
| C | 18.2 | 90.0 |
| D | 3.4 | 10.1 |
| E | 3.2 | 12.2 |
| F | 3.3 | 9.2 |
| G | 2.5 | 6.1 |
| H | 2.9 | 4.0 |
| I | 1.8 | 4.4 |

As a test of stain resistance, flooring compositions were prepared in a conventional manner. Such compositions contained the following ingredients, all figures being in parts by weight:

EXAMPLE V

| | Parts |
|---|---|
| Polyvinyl chloride | 100 |
| Plasticizer | 38 |
| Limestone | 180 |
| Titanium dioxide | 15 |
| Barium-cadmium stabilizer | 2.5 |
| Paraffin wax | 0.5 |
| Stearic acid | 0.5 |
| Epoxidized soybean oil | 1.0 |

After the usual mixing and sheet forming operation, test installations were made wherein white floor coverings in the form of sheets having the above formulation were installed in heavy traffic areas. After three months of use, the flooring was inspected for staining. The compositions containing plasticizers A, B and C were appreciably darker and carried a heavier, yellow, permanent traffic stain than the compositions containing plasticizers D through I.

In order to assess quantitative values, stain tests were made with unfilled vinyl tile and filled vinyl tile containing various plasticizers selected from plasticizers A through K. A 0.5% Du Pont oil soluble yellow dye dissolved in kerosene was used as the stainant in the examples shown in Tables II and III. The stainant remained in contact with the plasticized unfilled vinyl tile samples for thirty minutes and contacted the plasticized filled vinyl tile sample for five minutes. The intensity of stain was measured on a G.E. recording spectrophotometer, Model 7015E 30 G 62. This instrument determined the tristimulus values (XYZ) for which dominant wave lengths and the excitaiton purity of the hue of color are calculated in accordance with the ICI (International Committee of Illumination) method. The excitation purity value is used to compare one tile with another tile, wherein 0% purity equals pure white light and 100% purity equals a pure spectral color, such as yellow. The lower purity value indicates greater stain resistance. PHR represents the parts of plasticizer used per 100 parts of resin.

TABLE II.—PLASTICIZED UNFILLED VINYL TILE

| Plasticizer | PHR | Percent Purity |
|---|---|---|
| C | 25 | 60.8 |
| I | 25 | 28.9 |
| J | 25 | 24.5 |
| I | 30 | 27.6 |
| J | 30 | 27.4 |
| K | 32 | 32.1 |
| A | 67 | 56.0 |
| C | 67 | 82.0 |
| I | 67 | 51.0 |
| J | 67 | 30.0 |

The filled vinyl tile formulations in Table III comprise the ingredients shown in the conventional floor tile in Example V with the exception that the plasticizer has been used in varied concentrations.

TABLE III.—PLASTICIZED FILLED VINYL TILE

| Plasticizer | PHR | Percent Purity |
|---|---|---|
| A | 33 | 72.5 |
| C | 35 | 68.4 |
| I | 44 | 26.1 |
| K | 45 | 31.1 |

The foregoing tables demonstrate the remarkable stain resistant effect which can be obtained using hydroxy alkyl sulfonamides with conventional vinyl resin plasticizers in floor tile formulations.

While this invention has been described with respect to certain specific embodiments, it is not so limited. It is to be understood that variations and modifications thereof may be made without departing from the spirit and scope of the invention.

The embodiments of the invention in which an exclusive property or privilege is claimed are defined as follows:

1. A vinyl chloride resin composition comprising a polymerized vinyl chloride resin selected from the group consisting of polyvinyl chloride, vinyl chloride-vinyl acetate copolymer, and mixtures thereof, and from about 5 to about 100 parts by weight, per 100 parts by weight of resin, of a mixture of a vinyl resin plasticizer selected from the class consisting of dialkyl phthalates, alkyl aryl phthalates, triaryl phosphates, alkyl diaryl phosphates, dialkyl sebacates, dialkyl adipates, alkyl phthalyl alkyl glycolates, diaryl glycolates, alkylene glycol dibenzoates, epoxidized soybean oil fatty acids, chlorinated paraffin, and partially hydrogenated terphenyls, and a hydroxy alkyl sulfonamide of the formula:

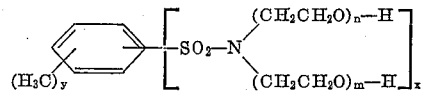

wherein:

$m$ is an integer from zero to 4.
$n$ is an integer from 1 to 4.
$x$ is an integer from 1 to 2.
$y$ is an integer from zero to 2.

from about 1 to 10 parts of the former being employed per part of the latter.

2. A composition as defined in claim 1 wherein from about 20 to about 50 parts by weight of said mixture are employed per 100 parts by weight of resin.
3. A composition as defined in claim 1 wherein said resin is polyvinyl chloride.
4. A composition as defined in claim 1 wherein said mixture is from about 1 to 4 parts of vinyl resin plasticizer per part of hydroxy alkyl sulfonamide.
5. A vinyl chloride resin composition comprising polyvinyl chloride and from about 20 to 50 parts by weight, per 100 parts by weight of polyvinyl chloride, of a mixture of butyl benzyl phthalate and N-(β-hydroxyethyl)-o,p-toluenesulfonamide, from about 1 to 4 parts of the former being employed per part of the latter.
6. A composition as defined in claim 5 wherein about 3 parts of butyl benzyl phthalate is employed per part of N-(β-hydroxyethyl)-o,p-toluenesulfonamide.
7. A composition as defined in claim 5 wherein about 1 part of butyl benzyl phthalate is employed per part of N-(β-hydroxyethyl)-o,p-toluenesulfonamide.
8. A vinyl chloride resin composition comprising polyvinyl chloride and from about 20 to 50 parts by weight, per 100 parts by weight of polyvinyl chloride, of a mixture of N-(β-hydroxy-ethyl)-o,p-toluenesulfonamide and dibenzyl diglycolate, from about 1 to 4 parts of the former being employed per part of the latter.
9. A composition as defined in claim 8 wherein about 3 parts of dibenzyl diglycolate is employed per part of N-(β-hydroxyethyl)-o,p-toluenesulfonamide.
10. A composition as defined in claim 8 wherein about 1 part of dibenzyl diglycolate is employed per part of N-(β-hydroxyethyl)-o,p-toluenesulfonamide.
11. A vinyl chloride resin composition comprising polyvinyl chloride and from about 20 to 50 parts by weight, per 100 parts by weight of polyvinyl chloride, of a mixture of dibenzyl diglycolate and N,N-di(β-hydroxyethyl)-o,p-toluenesulfonamide, from about 3 parts of the former being employed per part of the latter.
12. A vinyl chloride resin composition comprising polyvinyl chloride and from about 20 to 50 parts by weight, per 100 parts by weight of polyvinyl chloride, of a mixture of butyl benzyl phthalate and N,N-di(β-hydroxyethyl)-o,p-toluenesulfonamide, from about 7 parts of the latter being employed per 3 parts of the former.

References Cited

UNITED STATES PATENTS

| | | | |
|---|---|---|---|
| 2,093,947 | 9/1937 | Albrecht. | |
| 2,577,256 | 12/1951 | Lundsted | 260—30.8 |
| 3,075,928 | 1/1963 | Lanhan | 260—30.8 |
| 3,091,597 | 5/1963 | Henriques | 260—31.8 |

MORRIS LIEBMAN, *Primary Examiner.*

L. T. JACOBS, *Assistant Examiner.*